United States Patent
Melzl et al.

(10) Patent No.: US 11,273,781 B2
(45) Date of Patent: Mar. 15, 2022

(54) METHOD FOR TRIGGERING A PLURALITY OF ACTUATORS OF A SAFETY SYSTEM OF A MOTOR VEHICLE FROM AN ENERGY SOURCE

(71) Applicant: CONTINENTAL AUTOMOTIVE GMBH, Hannover (DE)

(72) Inventors: Hubert Melzl, Obertraubling (DE); Ludwig Ertl, Bad Abbach/Peising (DE); Ernst Futterlieb, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 135 days.

(21) Appl. No.: 16/666,100

(22) Filed: Oct. 28, 2019

(65) Prior Publication Data

US 2020/0062201 A1    Feb. 27, 2020

Related U.S. Application Data

(63) Continuation of application No. PCT/DE2018/200024, filed on Mar. 12, 2018.

(30) Foreign Application Priority Data

May 5, 2017  (DE) .................... 10 2017 207 578.3

(51) Int. Cl.
*B60R 21/017* (2006.01)

(52) U.S. Cl.
CPC .................. *B60R 21/017* (2013.01)

(58) Field of Classification Search
CPC ........ B60R 21/017; B60R 2021/01204; B60R 2021/01075; B60R 21/01
USPC ............ 307/9.1, 10.1; 701/45; 180/271, 282
See application file for complete search history.

(56) References Cited

U.S. PATENT DOCUMENTS

| | | | | |
|---|---|---|---|---|
| 5,432,385 A * | 7/1995 | Kincaid | ................ | B60R 21/017 280/735 |
| 7,667,345 B2 * | 2/2010 | Budweg | ................... | B60N 2/22 307/9.1 |
| 9,849,852 B1 * | 12/2017 | Larner | ................ | B60R 21/0134 |
| 2006/0012941 A1 * | 1/2006 | Heckel | ................... | H02J 7/345 361/247 |
| 2006/0108781 A1 * | 5/2006 | Giordano | ............ | B60R 21/0132 280/735 |
| 2006/0175116 A1 * | 8/2006 | Friedman | ............. | B60N 2/4242 180/282 |
| 2007/0289855 A1 | 12/2007 | Schumacher et al. | | |
| 2010/0148805 A1 | 6/2010 | Imhoff | | |
| 2011/0175555 A1 | 7/2011 | Daemmrich et al. | | |
| 2011/0196629 A1 | 8/2011 | Coutelou et al. | | |
| 2012/0023933 A1 * | 2/2012 | Ulrey | ..................... | F02M 26/05 60/605.2 |

FOREIGN PATENT DOCUMENTS

| | | |
|---|---|---|
| CN | 2138595 Y | 7/1993 |
| CN | 1926010 A | 3/2007 |
| CN | 102147430 A | 8/2011 |
| CN | 102148087 A | 8/2011 |
| DE | 19507619 A1 | 9/1996 |
| DE | 19627877 A1 | 1/1998 |
| DE | 19752622 C1 | 9/1999 |
| DE | 19917340 C1 | 7/2000 |
| DE | 102004010135 A1 | 9/2005 |
| DE | 102007055123 A1 | 5/2009 |
| EP | 2187227 A1 | 5/2010 |
| WO | 2015117581 A1 | 8/2015 |

OTHER PUBLICATIONS

Chinese Office Action dated Mar. 1, 2021 for the counterpart Chinese Application No. 201880009418.5.
International Search Report and Written Opinion dated Jun. 26, 2018 from corresponding International Patent Application No. PCT/DE2018/200024.
German Search Report dated Nov. 2, 2017 for corresponding German Patent Application No. 10 2017 207 578.3.

* cited by examiner

*Primary Examiner* — Hal Kaplan
*Assistant Examiner* — Swarna N Chowdhuri

(57) ABSTRACT

A method and a control unit for triggering a plurality of actuators of a safety system of a motor vehicle from an energy source are provided. The triggering and a respectively desired trigger time window for the respective actuator are determined based on sensor signals. An on-board electrical system and, in addition, at least one autarky capacitor are provided as the energy source, where the autarky capacitor/s is/are charged from the on-board electrical system. In the event of a destruction of the on-board electrical system, the triggering is adjusted such that at least a part of the actuators provided for triggering are still triggered.

9 Claims, No Drawings

METHOD FOR TRIGGERING A PLURALITY OF ACTUATORS OF A SAFETY SYSTEM OF A MOTOR VEHICLE FROM AN ENERGY SOURCE

CROSS-REFERENCE TO RELATED APPLICATIONS

This application claims the benefit of PCT Application PCT/DE2018/200024, filed Mar. 12, 2018, which claims priority to German Application DE 10 2017 207 578.3, filed May 5, 2017. The disclosures of the above applications are incorporated herein by reference.

TECHNICAL FIELD

The disclosure relates to a method for triggering a plurality of actuators of a safety system of a motor vehicle from an energy source.

BACKGROUND

Igniters are usually ignited from an energy source. To this end, in addition to an on-board electrical system and at least one autarky capacitor is provided, wherein the autarky capacitor/s is/are charged from the on-board electrical system, possibly also to a higher value compared with a voltage value on the on-board electrical system.

In general, the ignition path runs via a central safing transistor, ignition circuit-specific high-side switches, the igniter and ignition circuit-specific low-side switches back via the vehicle chassis ground. A trigger time is decided by a crash detection algorithm. The number of controlled igniters is not included in this decision. Accordingly, the circuit is designed to be able to trigger all of the igniters simultaneously.

While in the case of a small number of igniters, a time-staggered triggering of restraining means is not necessary, since the basic design covers simultaneous triggering; however, with considerable additional expense this may be possible by increasing the number of igniters. Therefore, the igniters are then triggered on a staggered basis in groups.

In addition, a method for triggering a passive occupant protection system for motor vehicles is, for example, known from DE 19627877 A1, in which at least one triggering current is supplied to one electrical igniter for protecting one individual in the event of a dangerous collision, in particular an airbag, safety belt tightener, in order to supply ignition energy, the triggering current being produced as the discharge current of an autarky capacitor in the event of malfunctions of the motor vehicle's on-board electrical system. This autarky capacitor simultaneously provides the triggering currents for multiple igniters, where the triggering current of each igniter is pulse-width modulated in such a manner that the ignition power required for the respective igniters is adjusted via the pulse/pause ratio of the triggering current. In addition, DE 19917340 C1 describes an apparatus for triggering occupant protection means of a motor vehicle, having multiple ignition circuits as well as a control unit for producing a trigger algorithm on the basis of sensor signals and for controlling the power switches on the basis of the trigger algorithm and an energy store for supplying the ignition circuits with power, in which power is only supplied for a part of the ignition circuits by the energy store and the power per ignition circuit is dependent on predefined priorities if the energy reserve is insufficient for all of the ignition circuits to be ignited.

A method where, independently of the issue of a possible destruction of the on-board electrical system, a maximum group size of actuators for triggering within a time window is predefined and for successive time windows, individual, at least partly different, maximum group sizes are respectively predefined and the maximum group size for the respective time window is determined adaptively based on the actuators already actually triggered in preceding time windows, is already known from WO 2015117581 A1.

Different priorities are predefined for the actuators, for example, and the actuators are triggered based on their priority within a time window, and the triggering of a number of actuators exceeding the current, adaptively adjusted maximum group size is shifted to following time windows.

In the case of a fixed grouping, the group size or respectively the circuit design must be based on the worst case. This is the last required time at the end of the autarky time (in the event of a battery interruption), since the energy reserve is already partially discharged by switching operation and previous triggering of groups prior to the triggering.

The adaption of the maximum group size is therefore only a coarse grid for the adjustment of the triggering and the components of the circuit still have to be designed for a maximum group size which is as large as possible. Given the increasing number of actuators and the required autarky time, the required size and, therefore as well as the installation space, the costs for the autarky capacitor/s therefore increase in particular.

SUMMARY

One aspect of the disclosure provides a method as well as a corresponding control unit for triggering a plurality of actuators of a safety system of a motor vehicle from an energy source. The requirement for triggering and a respectively desired trigger time window for the respective actuator are determined based on sensor signals.

An on-board electrical system and, in addition, at least one autarky capacitor are provided as the energy source, where the autarky capacitor/s is/are charged from the on-board electrical system. In the event of a destruction of the on-board electrical system, the triggering is adjusted such that at least a part of the actuators provided for triggering are still triggered.

In some examples, in the event of a destruction of the on-board electrical system, the currently available amount of energy in the at least one autarky capacitor is measured or estimated for all respective remaining trigger time windows, and based on the amount of energy, it is checked whether all actuators provided for triggering in this respective remaining trigger time window may be triggered. If they can, they are triggered. If not, based on a predefined rule, those actuators are selected from the actuators provided for triggering in the trigger time window which may actually be triggered in the trigger time window with the energy amount currently available in the trigger time window, and the triggering of the remaining actuators provided for triggering in the trigger time window are shifted into the following trigger time window/s. Thus, a triggering may be effected with the maximum number of actuators, based on the available energy amount, i.e. the remaining energy amount is optimally utilized.

The details of one or more implementations of the disclosure are set forth in the accompanying drawings and the description below. Other aspects, features, and advantages will be apparent from the description and drawings, and from the claims.

DETAILED DESCRIPTION

The described method and corresponding control unit optimizes triggering a plurality of actuators of a safety system of a motor vehicle from an energy source In some implementations, in the event of a destruction of the on-board electrical system, the amount of energy which is actually currently (still) available in the at least one autarky capacitor is measured or estimated for all respective remaining trigger time windows. Based on the amount of energy, it is checked whether all actuators provided for triggering in this respective remaining trigger time window may be triggered. If they can be triggered, then they are of course triggered. Unlike a fixed maximum group size, it is thus possible to trigger an adjustment to the maximum number of actuators per available energy amount, i.e. the amount of energy may be optimally utilized.

If the amount of energy is insufficient, based on a predefined rule those actuators are selected from the actuators actually provided for triggering in the trigger time window which can be triggered in this respective remaining trigger time window with the energy amount currently available in the trigger time window. It is true that DE 19917340 C1 also uses such a priority rule, but the triggering for the remaining actuators is definitively prevented therein. In the present method, however, the triggering of the remaining actuators provided for triggering in the trigger time window are shifted into the following trigger time window/s, i.e. as a rule only slightly delayed, but nevertheless triggered.

The steps may be repeated for all respective remaining trigger time windows. In some examples, this only occurs provided that the energy amount then currently still available was not previously insufficient to trigger at least one actuator.

In some implementations, the energy amount currently available is determined by measuring the voltage across the at least one autarky capacitor. This may be determined cyclically, for example immediately prior to the respective trigger time window. The advantage of this is that neither the length of time since the destruction of the on-board electrical system nor the actuators which have already been ignited have to be considered.

However, in some implementations, the measurement is avoided, but the energy amount currently available can at least be estimated by a length of time since the destruction of the on-board electrical system is detected by way of a time clock and to which a reduced available amount of energy is assigned to the time interval.

In addition, in some examples, at least one discharge characteristic is predefined for the actuators which have been triggered since the destruction of the on-board electrical system, but corresponding discharge curves may also be predefined for groups or individually for each of the actuators. However, since the actuators, as a rule, currently have a standardized energy consumption, a simple counting of these can be effected, and the remaining amount of energy can be extrapolated from the number of actuators which have already been ignited since the destruction of the on-board electrical system.

Accordingly, a control unit for a safety system for triggering a plurality of actuators is configured to perform the corresponding method, in particular with memory storing a corresponding algorithm for running on a microprocessor of the control unit.

The wiring is designed such that at normal ambient conditions (battery voltage present) the triggering of up to n=max group size igniters at the same time is guaranteed. If, however, the control unit is running in autarkic mode, fewer than n igniters can be ignited at the same time—the triggering of these restraining means, if necessary in a later trigger time window, is nevertheless guaranteed. By determining the available amount of energy, the ideal group size for the pending triggering can subsequently be determined. The amount of energy does of course reduce in autarkic mode as the time increases, on the one hand, and due to the triggering operations already effected, on the other hand.

The following determination methods amongst others would be conceivable:

"Linear approximation", i.e. constant decrease in energy over the (autarky) time, "Characteristic", i.e. decrease curve of the energy over the (autarky) time, "Adaptive", i.e. measurement of the capacitor voltage in order to estimate the amount of energy still actually available currently, for example, in each trigger time window, i.e. in each case prior to this one.

As a result, the triggering behavior under normal conditions is not influenced by the reduced performance during autarkic mode, whereas the best triggering performance at this time is always chosen in autarkic mode by an energy-optimized grouping.

Applications which only function to a limited extent in certain conditions may make ideal use of the available energy amount with knowledge of the available energy amount.

Initial evaluations show that, compared with a conventional system, by using this method with a 20 to 30% smaller autarky capacitor, the triggering of all of the actuators may still be guaranteed, even in the event of an extremely unlikely destruction of the on-board electrical system prior to the initial triggering. The triggering times thereof are simply shifted, if necessary, to later trigger time windows, however this corresponds precisely to an emergency operation situation and a sufficiently safe triggering behavior may still be guaranteed, even in this case, by the priority rules, while the necessary total costs are considerably lowered due to the smaller autarky capacitor and, therefore, the smaller installation space as well.

A number of implementations have been described. Nevertheless, it will be understood that various modifications may be made without departing from the spirit and scope of the disclosure. Accordingly, other implementations are within the scope of the following claims.

What is claimed is:

1. A method for triggering a plurality of actuators of a safety system of a motor vehicle from an energy source, the energy source including an on-board electrical system and at least one autarky capacitor charged from the on-board electrical system, the triggering of the plurality of actuators and a respectively desired trigger time window for the respective actuators are determined based on sensor signals, in the event of a destruction of the on-board electrical system, the method comprising:

triggering an actuator of the plurality of actuators;

measuring a currently available amount of energy in the at least one autarky capacitor for all respective remaining trigger time windows of the at least one autarky capacitor during which the at least one autarky capacitor outputs voltage for triggering the plurality of actuators in the event of the destruction of the on-board electrical system;

based on the currently available amount of energy, checking whether all actuators provided for triggering in a remaining trigger time window can be triggered;

for a first subset of the actuators provided for triggering in the remaining trigger time window that can be triggered, triggering the first subset of the actuators provided for triggering in the remaining trigger time window; and for a second subset of the actuators provided for triggering in the remaining trigger time window that cannot be triggered, shifting triggering of the second subset of the actuators provided for triggering in the remaining trigger time window that cannot be triggered to a following trigger time window of the at least one autarky capacitor among the remaining trigger time windows.

2. The method of claim 1, wherein the currently available amount of energy is measured as a voltage over the at least one autarky capacitor.

3. The method of claim 1, wherein the currently available amount of energy is estimated measured by way of a time clock from a time of the destruction of the on-board electrical system.

4. The method of claim 3, wherein at least one discharge characteristic for actuators among the plurality of actuators triggered since the destruction of the on-board electrical system is predefined.

5. A control unit for triggering a plurality of actuators of a safety system of a motor vehicle from an energy source, the energy source including an on-board electrical system and at least one autarky capacitor charged from the on-board electrical system, the triggering of the plurality of actuators and a respectively desired trigger time window for the respective actuators are determined based on sensor signals, in the event of a destruction of the on-board electrical system, the control unit executing a method comprising:

triggering an actuator of the plurality of actuators;

measuring a currently available amount of energy in the at least one autarky capacitor for all respective remaining trigger time windows of the at least one autarky capacitor during which the at least one autarky capacitor outputs voltage for triggering the plurality of actuators in the event of the destruction of the on-board electrical system;

based on the currently available amount of energy, checking whether all actuators provided for triggering in a remaining trigger time window can be triggered;

for a first subset of the actuators provided for triggering in the remaining trigger time window that can be triggered, triggering the first subset of the actuators provided for triggering in the remaining trigger time window; and for a second subset of the actuators provided for triggering in the remaining trigger time window that cannot be triggered, shifting triggering of the remaining trigger time window that cannot be triggered, shifting triggering of the second subset of the actuators provided for triggering in the remaining trigger time window that cannot be triggered to a following trigger time window of the at least one autarky capacitor among the remaining trigger time windows.

6. The control unit of claim 5, wherein measuring the currently available amount of energy in the at least one autarky capacitor comprises measuring a voltage over the at least one autarky capacitor.

7. The control unit of claim 5, wherein measuring the currently available amount of energy in the at least one autarky capacitor comprises measuring the currently available amount of energy by way of a time clock from a time of the destruction of the on-board electrical system.

8. The control unit of claim 7, wherein at least one discharge characteristic for actuators among the plurality of actuators triggered since the destruction of the on-board electrical system is predefined.

9. A method of a safety system of a motor vehicle including an autarky capacitor connected to an on-board electrical system powering a plurality of actuators deploying the safety system, the method comprising:

detecting a failure of an on-board electrical system;

measuring a first available amount of energy stored in the autarky capacitor for a first discharge window of the autarky capacitor among a plurality of discharge windows of the autarky capacitor during which the autarky capacitor outputs voltage for triggering the plurality of actuators; determining a first subset of the plurality of actuators to be triggered during the first discharge window based on the first available amount of energy;

triggering the first subset of the plurality of actuators during the first discharge window based on the first available amount of energy;

measuring a second available amount of energy stored in the autarky capacitor for a second discharge window of the autarky capacitor among the plurality of discharge windows of the autarky capacitor; determining a second subset of the plurality of actuators to be triggered during the second discharge window based on the second available amount of energy; and triggering the first subset of the plurality of actuators during the second discharge window based on the second available amount of energy.

* * * * *